United States Patent
He et al.

(10) Patent No.: US 12,439,432 B2
(45) Date of Patent: *Oct. 7, 2025

(54) PHYSICAL BROADCAST CHANNEL EXTENSION IN WIRELESS COMMUNICATIONS

(71) Applicant: Apple Inc., Cupertino, CA (US)

(72) Inventors: Hong He, San Jose, CA (US); Dawei Zhang, Saratoga, CA (US); Wei Zeng, San Diego, CA (US); Chunhai Yao, Beijing (CN); Haitong Sun, Cupertino, CA (US); Yuchul Kim, San Jose, CA (US); Yushu Zhang, Beijing (CN); Chunxuan Ye, San Diego, CA (US); Oghenekome Oteri, San Diego, CA (US); Weidong Yang, San Diego, CA (US); Yang Tang, San Jose, CA (US); Jie Cui, San Jose, CA (US); Haijing Hu, Los Gatos, CA (US); Zhibin Wu, Los Altos, CA (US); Fangli Xu, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/621,055

(22) Filed: Mar. 28, 2024

(65) Prior Publication Data

US 2024/0334457 A1 Oct. 3, 2024

Related U.S. Application Data

(63) Continuation of application No. 17/442,588, filed as application No. PCT/CN2020/074945 on Feb. 12, 2020, now Pat. No. 11,950,259.

(51) Int. Cl.
 *H04W 72/00* (2023.01)
 *H04W 72/30* (2023.01)

(52) U.S. Cl.
 CPC .................... *H04W 72/30* (2023.01)

(58) Field of Classification Search
 CPC ......................................... H04W 72/30
 See application file for complete search history.

(56) References Cited

U.S. PATENT DOCUMENTS

| 11,950,259 B2 * | 4/2024 | He .................. H04W 48/12 |
| 2012/0039256 A1 | 2/2012 | Kwon et al. |

(Continued)

FOREIGN PATENT DOCUMENTS

| CN | 103249167 | 8/2013 |
| CN | 109451863 | 3/2019 |

(Continued)

OTHER PUBLICATIONS

[No Author Listed], "3rd Generation Partnership Project; Technical Specification Group Radio Access Network; NR; Physical channels and modulation (Release 16)," 3GPP TS 38.211 V16.0.0, Dec. 2019, 129 pages.

(Continued)

*Primary Examiner* — Erika A Washington
(74) *Attorney, Agent, or Firm* — Fish & Richardson P.C.

(57) ABSTRACT

To extend a physical broadcast channel (PBCH) in wireless communications, an extended physical broadcast channel (EPBCH) transmission is generated with one or more legacy PBCH blocks and one or more EPBCH blocks within an extension window. A size of the extension window is determined based at least in part on a PBCH repetition number and a number of the legacy PBCH blocks relative to a number of the EPBCH blocks. The EPBCH transmission is transmitted by a base station (BS) to one or more user equipment (UE).

20 Claims, 14 Drawing Sheets

(56) References Cited

U.S. PATENT DOCUMENTS

| | | |
|---|---|---|
| 2014/0098761 A1 | 4/2014 | Lee et al. |
| 2014/0204851 A1 | 7/2014 | Chen et al. |
| 2014/0301305 A1 | 10/2014 | Xu et al. |
| 2016/0128011 A1 | 5/2016 | Yang et al. |
| 2018/0054837 A1 | 2/2018 | Islam et al. |
| 2018/0227797 A1 | 8/2018 | Liu et al. |
| 2019/0044690 A1 | 2/2019 | Yi et al. |
| 2019/0090219 A1 | 3/2019 | Lee et al. |
| 2019/0191457 A1 | 6/2019 | Si et al. |
| 2020/0036471 A1 | 1/2020 | Uesaka et al. |
| 2023/0008907 A1 | 1/2023 | He et al. |

FOREIGN PATENT DOCUMENTS

| | | |
|---|---|---|
| CN | 110460411 | 11/2019 |
| JP | 2016-519892 | 7/2016 |
| JP | 2016-535561 | 11/2016 |
| JP | 2019-050575 | 3/2019 |
| WO | WO 2017196406 | 11/2017 |

OTHER PUBLICATIONS

[No Author Listed], "3rd Generation Partnership Project; Technical Specification Group Radio Access Network; NR; Physical layer procedures for control (Release 16)," 3GPP TS 38.213 V16.0.0, Dec. 2019, 146 pages.

International Preliminary Report on Patentability in International Appln. No. PCT/CN2020/074945, mailed on Aug. 25, 2022, 5 pages.

International Search Report and Written Opinion in International Appln. No. PCT/CN2020/074945, mailed on Oct. 27, 2020, 6 pages.

Lenovo et al., "View of Rel-17 NR-Light," 3GPP TSG RAN Meeting #85, RP-192018, Newport Beach, USA, Sep. 16-20, 2019, 10 pages.

Wilus Inc., "Enhancement to initial access procedure for NR-unlicensed, " 3GPP TSG RAN WG1 Meeting #97, R1-1907381, Reno, USA, May 13-17, 2019, 5 pages.

* cited by examiner

PHYSICAL BROADCAST CHANNEL EXTENSION IN WIRELESS COMMUNICATIONS

CROSS-REFERENCE TO RELATED APPLICATIONS

This application is a continuation of, and claims priority to, U.S. patent application Ser. No. 17/442,588, filed Sep. 23, 2021, now U.S. Pat. No. 11,950,259, which is a U.S. National Phase Application under 35 U.S.C. § 371 of International Patent Application No. PCT/CN2020/074945, filed Feb. 12, 2020, the entire disclosures of each of which are incorporated herein by reference.

TECHNICAL FIELD

This disclosure relates generally to physical broadcast channel (PBCH) techniques for wireless networks, such as cellular networks.

BACKGROUND

Wireless communication systems are rapidly growing in usage. Further, wireless communication technology has evolved from voice-only communications to also include the transmission of data, such as Internet and multimedia content, to a variety of devices.

SUMMARY

In general, in an aspect, a method for operating a base station (BS) includes generating an extended physical broadcast channel (EPBCH) transmission including one or more legacy PBCH blocks and one or more EPBCH blocks within an extension window. A size of the extension window is determined based at least in part on a PBCH repetition number and a number of the legacy PBCH blocks relative to a number of the EPBCH blocks. The EPBCH transmission is transmitted, by the BS, to one or more user equipment (UE).

In general, in an aspect, a BS includes one or more processors and memory that, when executed by the one or more processors, cause the one or more processors to perform operations including: generating an EPBCH transmission including one or more legacy PBCH blocks and one or more EPBCH blocks within an extension window, where a size of the extension window is determined based at least in part on a PBCH repetition number and a number of the legacy PBCH blocks relative to a number of the EPBCH blocks, and transmitting, by the BS, the EPBCH transmission to one or more UEs.

In general, in an aspect, non-transitory computer readable storage medium stores instructions that, when executed by one or more processors, cause the one or more processors to perform operations including: generating an EPBCH transmission including one or more legacy PBCH blocks and one or more EPBCH blocks within an extension window, where a size of the extension window is determined based at least in part on a PBCH repetition number and a number of the legacy PBCH blocks relative to a number of the EPBCH blocks, and transmitting, by a BS, the EPBCH transmission to one or more UE.

Implementations of any of the above aspects can include one or a combination of two or more of the following features.

The one or more EPBCH blocks can transmitted by the BS in each transmission time interval (TTI). In some implementations, the BS can determine whether an EPBCH block of the one or more EPBCH blocks overlaps with another data block in a current TTI, and the transmission of the EPBCH block can be scheduled based on the determination. In some implementations, the one or more EPBCH blocks are transmitted by the BS at a predefined periodicity according to a time-domain pattern. For example, the EPBCH blocks can be transmitted according to a time-domain pattern defined by SFN mod (m*T), where SFN represents system frame number, T represents a PBCH block period, and m represents a number of PBCH periods. The predefined periodicity can be based at least in part on a frequency band of the EPBCH transmission.

In some implementations, the extension window starts from a slot after the last of the one or more legacy PBCH blocks. Alternatively, in some implementations, the extension window starts from a slot before the first of the one or more legacy PBCH blocks and ends at a slot after the last of the one or more legacy PBCH blocks. At least one of the one or more EPBCH blocks can include PBCH. The PBCH can be scaled and mapped to two symbols. The PBCH can occupy an increased number of resource blocks in each of the two symbols relative to a number of resource blocks occupied by PBCH in each symbol of the legacy PBCH blocks. In some implementations, the symbols of the one or more EPBCH blocks are mapped to preserve uplink control symbols or downlink control symbols or both. In some implementations, the one or more EPBCH blocks include a primary synchronization signal (PSS) and a secondary synchronization signal (SSS) in addition to the PBCH.

In general, in an aspect, a method for operating UE includes receiving, from a BS, an EPBCH transmission comprising one or more legacy PBCH blocks and one or more EPBCH blocks included in an extension window. A size of the extension window is determined based at least in part on a PBCH repetition number and a number of the legacy PBCH blocks relative to a number of the EPBCH blocks The EPBCH transmission is processed by the UE to obtain system information.

In general, in an aspect, a UE includes one or more processors and memory storing instructions that, when executed by the one or more processors, cause the one or more processors to perform operations including receiving, from a BS, an EPBCH transmission including one or more legacy PBCH blocks and one or more EPBCH blocks included in an extension window, where a size of the extension window is determined based at least in part on a PBCH repetition number and a number of the legacy PBCH blocks relative to a number of the EPBCH blocks, and processing the EPBCH transmission to obtain system information.

In general, in an aspect, a non-transitory computer readable storage medium storing instructions that, when executed by one or more processors, cause the one or more processors to perform operations including receiving, from a BS, an EPBCH transmission including one or more legacy PBCH blocks and one or more EPBCH blocks included in an extension window, where a size of the extension window is determined based at least in part on a PBCH repetition number and a number of the legacy PBCH blocks relative to a number of the EPBCH blocks, and processing the EPBCH transmission to obtain system information.

Implementations of any of the above aspects can include one or a combination of two or more of the following features.

The one or more EPBCH blocks can be received by the UE in each transmission time interval (TTI). In some implementations, the BS is configured to determine whether an EPBCH block of the one or more EPBCH blocks overlaps with another data block in a current TTI, and the EPBCH block is received based on a determination by the BS that the EPBCH block does not overlap with another data block in the current TTI. In some implementations, the one or more EPBCH blocks are received by the UE at a predefined periodicity according to a time-domain pattern. For example, the EPBCH blocks can be received according to a time-domain pattern defined by SFN mod (m*T), where SFN represents system frame number, T represents a PBCH block period, and m represents a number of PBCH periods. The predefined periodicity can be based at least in part on a frequency band of the EPBCH transmission.

The UE can be a reduced capability UE having one or a combination of two or more of the following features: a reduced bandwidth, a reduced peak data rate, a reduced transmission power, a reduced number of soft channel bits, a reduced transport block size for broadcast or unicast, or no simultaneous reception of broadcast or unicast transport blocks.

In some implementations, the extension window starts from a slot after the last of the one or more legacy PBCH blocks. Alternatively, in some implementations, the extension window starts from a slot before the first of the one or more legacy PBCH blocks and ends at a slot after the last of the one or more legacy PBCH blocks. The UE can determine whether an EPBCH block of the one or more EPBCH blocks is present in the transmission by correlating hypothetical resource elements containing EPBCH with the received EPBCH transmission. At least one of the one or more EPBCH blocks can include PBCH. The PBCH can be scaled and mapped to two symbols. The PBCH can occupy an increased number of resource blocks in each of the two symbols relative to a number of resource blocks occupied by PBCH in each symbol of the legacy PBCH blocks. In some implementations, the symbols of the one or more EPBCH blocks are mapped to preserve uplink control symbols or downlink control symbols or both. In some implementations, the one or more EPBCH blocks include a primary synchronization signal (PSS) and a secondary synchronization signal (SSS) in addition to the PBCH.

The details of one or more implementations are set forth in the accompanying drawings and the description below. Other features and advantages will be apparent from the description and drawings, and from the claims.

BRIEF DESCRIPTION OF DRAWINGS

Like reference symbols in the various drawings indicate like elements.

DETAILED DESCRIPTION

The techniques described here relate to an extended physical broadcast channel (EPBCH) which can improve coverage for user equipment (UE), including reduced capability UE, in wireless communication networks such as a 5G new radio (NR) network. In some implementations, the EBPCH includes repeated transmissions of PBCH information during an extension window that starts before or after a legacy PBCH transmission. In this manner, UEs are provided with more opportunities and greater flexibility to obtain system information to connect to the wireless communication network. The EPBCH may be transmitted during each transmission time interval (TTI), or may be dynamically transmitted based on the presence of overlapping transmissions or according to a time-domain pattern to avoid collisions and reduce power consumption. The techniques described here also provide for mapping of the EPBCH transmission to resources within the channel in a way that conforms with existing standards.

Figure 1:
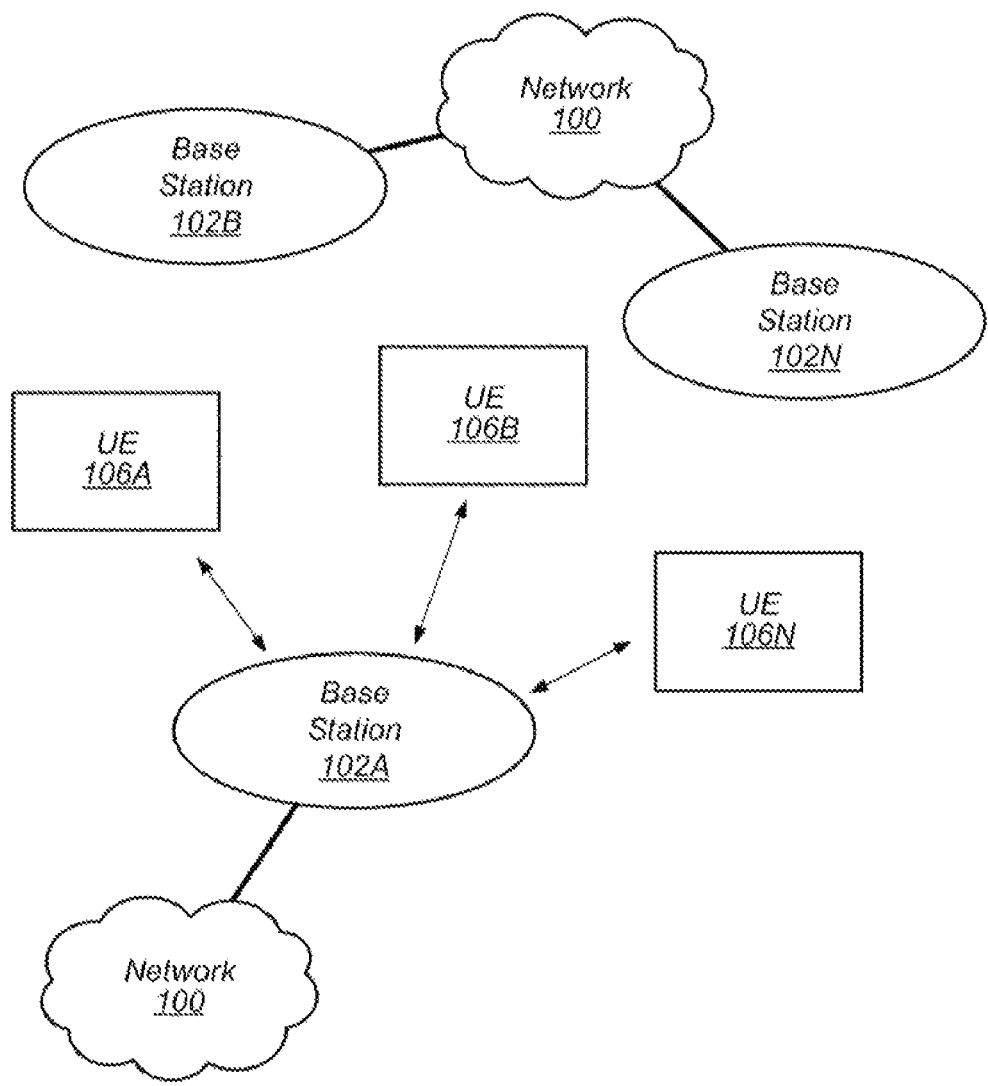
FIG. 1 illustrates an example wireless communication system.

FIG. 1 illustrates an example wireless communication system 100. It is noted that the system of FIG. 1 is merely one example of a possible system, and that features of this disclosure may be implemented in any of various systems, as desired.

The system 100 includes a base station 102A which communicates over a transmission medium with one or more user devices 106A, 106B, . . . , 106N. Each of the user devices may be referred to herein as a "user equipment" (UE). Thus, the user devices 106 are referred to as UEs or UE devices. In some implementations, the UEs may be reduced capability or "light" UEs, as described in detail below.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, or 3GPP2 CDMA2000 (e.g., 1xRTT, 1xEV-DO, HRPD, eHRPD), or combinations of them, among others. Note that if the base station 102A is implemented in the context of LTE, it may alternately be referred to as an 'eNodeB' or 'eNB.' Note that if the base station 102A is implemented in the context of 5G NR, it may alternately be referred to as 'gNodeB' or 'gNB.'

The base station 102A is equipped to communicate with a network 100 (e.g., a core network of a cellular service provider, a telecommunication network such as a public switched telephone network (PSTN), or the Internet, or combinations of them, among others). Thus, the base station 102A may facilitate communication between the user devices and between the user devices and the network 100. In particular, the cellular base station 102A may provide UEs 106 with various telecommunication capabilities, such as voice, SMS and data services.

The base station 102A and other similar base stations (such as base stations 102B . . . 102N) operating according to the same or a different cellular communication standard may comprise a network of cells, which may provide continuous or nearly continuous overlapping service to UEs 106A-N and similar devices over a geographic area in accordance with, for example, one or more cellular communication standards.

Thus, while the base station 102A may act as a "serving cell" for the UEs 106A-N as illustrated in FIG. 1, each UE 106 may also be capable of receiving signals from (and possibly within communication range of) one or more other cells (which might be provided by base stations 102B-N or any other base stations, or by UEs themselves), which may be referred to as "neighboring cells." Such cells may also be capable of facilitating communication between user devices and/or between user devices and the network 100. Such cells may include "macro" cells, "micro" cells, "pico" cells, and/or cells which provide any of various other granularities of service area size. For example, the base stations 102A-B illustrated in FIG. 1 might be macro cells, while the base station 102N might be a micro cell. Other configurations are also possible.

In some embodiments, the base station 102A may be a next generation base station, e.g., a 5G New Radio (5G NR) base station, or "gNB." In some embodiments, a gNB may be connected to a legacy evolved packet core (EPC) network or to a NR core (NRC) network, among others. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) or peer-to-peer wireless communication protocol (e.g., Bluetooth or Wi-Fi peer-to-peer), or both, in addition to at least one cellular communication protocol (e.g., GSM, UMTS (associated with, for example, WCDMA or TD-SCDMA air interfaces), LTE, LTE-A, 5G NR, HSPA, or 3GPP2 CDMA2000 (e.g., 1×RTT, 1×EV-DO, HRPD, eHRPD), or combinations of them, among others). The UE 106 may also (or alternatively) be configured to communicate using one or more global navigational satellite systems (GNSS), such as GPS or GLONASS, one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
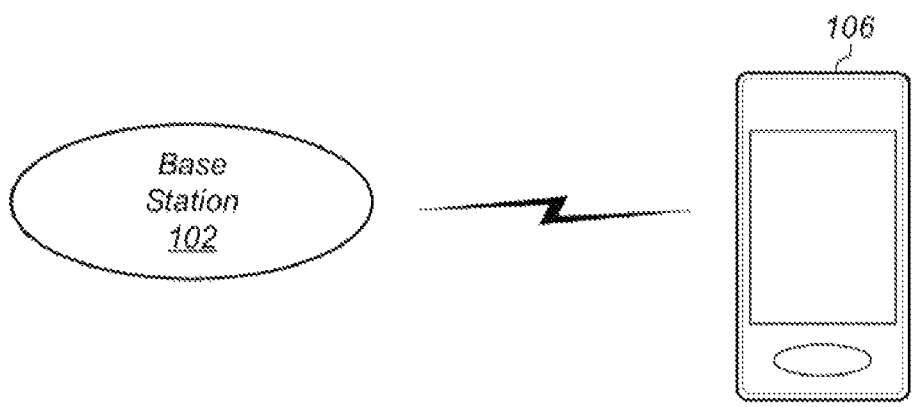
FIG. 2 illustrates a base station (BS) in communication with a user equipment (UE) device.

FIG. 2 illustrates user equipment 106 (e.g., one of the devices 106A through 106N) in communication with a base station 102. The UE 106 may be a device with cellular communication capability such as a mobile phone, a hand-held device, a computer or a tablet, or virtually any type of wireless device, including wireless sensors, surveillance equipment, or wearables devices, among others. In some implementations, the UE 106 is a reduced capability or "light" UE, as described below.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive or transmit chain, or both, between multiple wireless communication technologies, such as those discussed above.

In some implementations, the UE 106 includes separate transmit or receive chains, or both, (e.g., including separate antennas and other radio components) for each wireless communication protocol with which it is configured to communicate. In some implementations, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
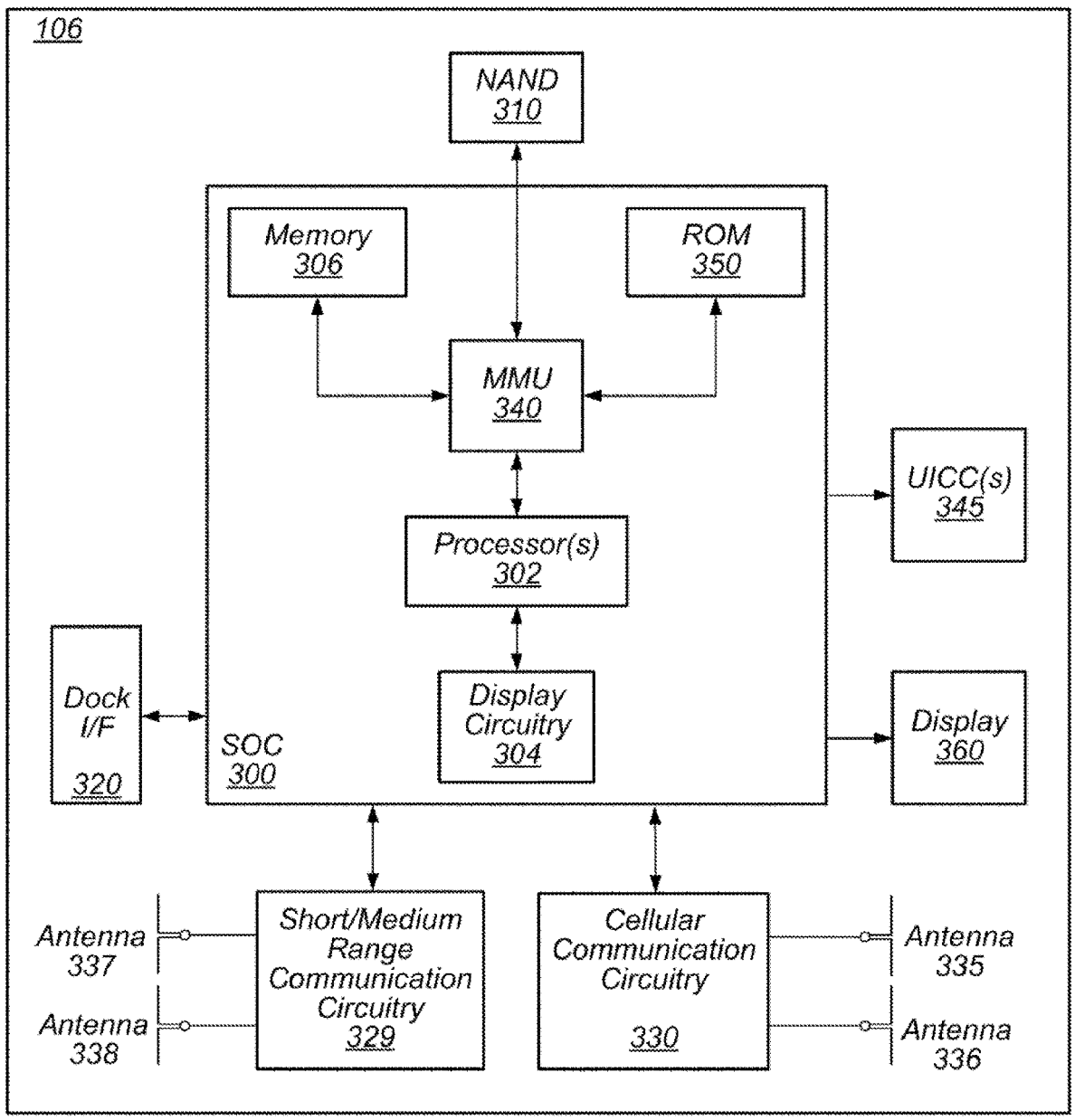
FIG. 3 illustrates an example block diagram of a UE.

FIG. 3 illustrates an example block diagram of a communication device 106. It is noted that the block diagram of the communication device 106 in FIG. 3 is only one example of a possible communication device. In some implementations, communication device 106 may be a user equipment (UE) device, a mobile device or mobile station, a wireless device or wireless station, a desktop computer or computing device, a mobile computing device (e.g., a laptop, notebook, or portable computing device), a tablet, a wireless sensor, a video surveillance system, or a wearable device, or a combination of them, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers), a display 360, which may be integrated with or external to the communication device 106, and cellular communication circuitry 330 such as for 5G NR, LTE, GSM, among others, and short to medium range wireless communication circuitry 329 (e.g., Bluetooth™ and WLAN circuitry). In some embodiments, the communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336. The short to medium range wireless communication circuitry 329 may also couple (e.g., communicatively; directly or indirectly) to one or more antennas, such as antennas 337 and 338. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 or cellular communication circuitry 330, or both, may include multiple receive chains and multiple transmit chains for receiving and transmitting multiple spatial streams, such as in a multiple-input multiple output (MIMO) configuration.

In some implementations, the cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some implementations, the cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include or be configured for use with one or more user interface elements. The user interface elements may include any of various elements, such as the display 360 (which may be a touchscreen display), a keyboard (which may be a discrete keyboard or may be implemented as part of a touchscreen display), a mouse, a microphone, a speaker, one or more cameras, one or more buttons, or combinations of them, among various other elements capable of providing information to a user or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some implementations, the MMU 340 may be included as a portion of the processor(s) 302.

The communication device 106 may include hardware and software components for implementing the above features for time division multiplexing UL data for NSA NR operations. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

The processor 302 may include one or more processing elements. For example, the processor 302 may include one or more integrated circuits (ICs) that are configured to perform the functions of the processor 302. Each integrated circuit may include circuitry (e.g., first circuitry, second circuitry, among other circuitry) configured to perform the functions of processor(s) 302.

Further, the cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
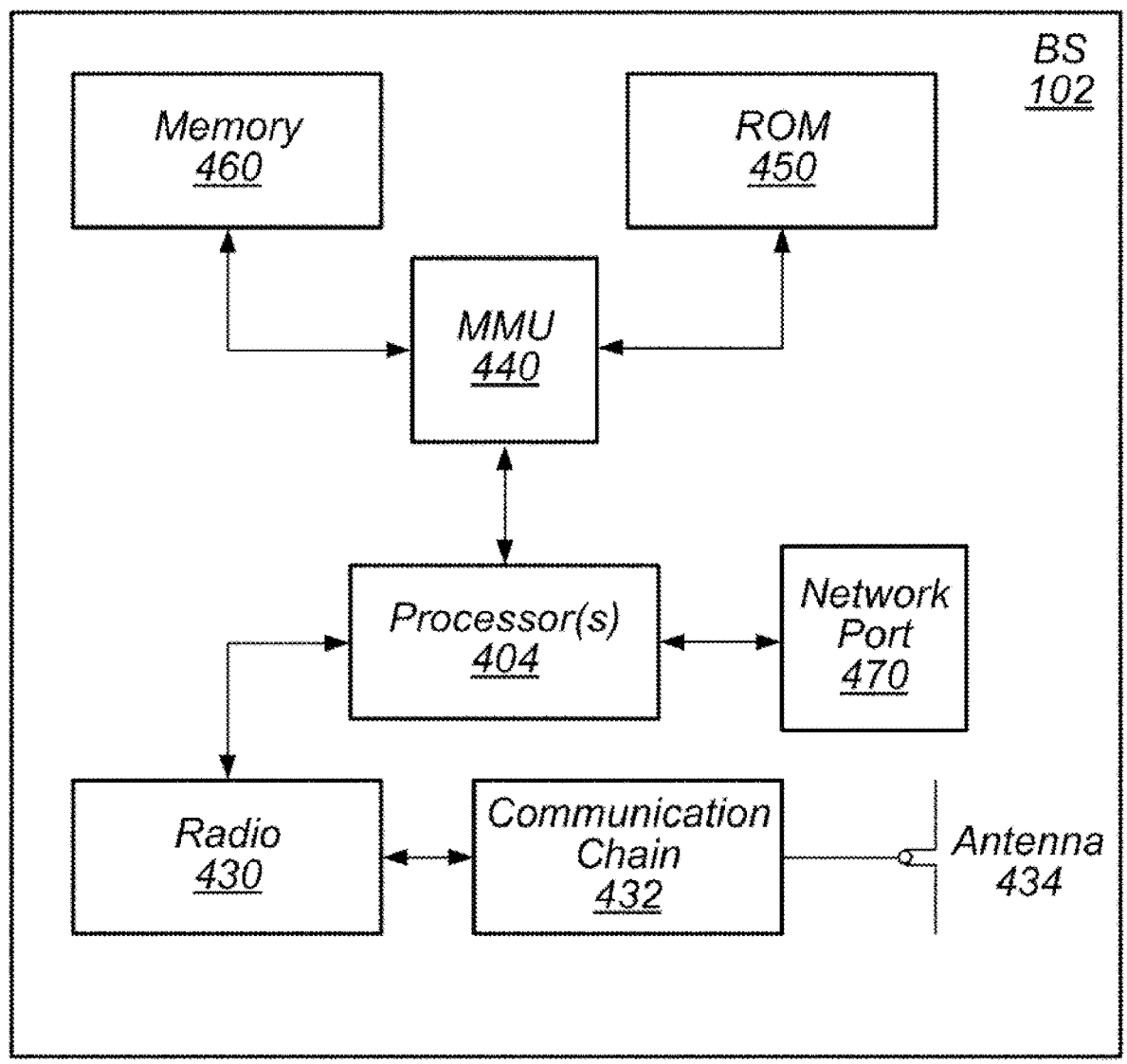
FIG. 4 illustrates an example block diagram of a BS.

FIG. 4 illustrates an example block diagram of a base station 102. It is noted that the base station of FIG. 4 is an example of a possible base station. As shown, the base station 102 includes processor(s) 404 which may execute program instructions for the base station 102. The processor(s) 404 may be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above with reference to FIGS. 1 and 2.

The network port 470 (or an additional network port) may also or alternatively be configured to couple to a cellular network, e.g., a core network of a cellular service provider. The core network may provide mobility related services or other services to a plurality of devices, such as UE devices 106. In some implementations, the network port 470 couples a telephone network using the core network, or the core network may provide a telephone network (e.g., among other UE devices serviced by the cellular service provider).

In some implementations, the base station 102 is a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, or Wi-Fi, or combinations of them, among others.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, or combinations of them, among others).

The BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In some implementations, the processor(s) 404 are comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, among other circuitry) configured to perform the functions of the processor(s) 404.

In some implementations, the radio 430 is comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
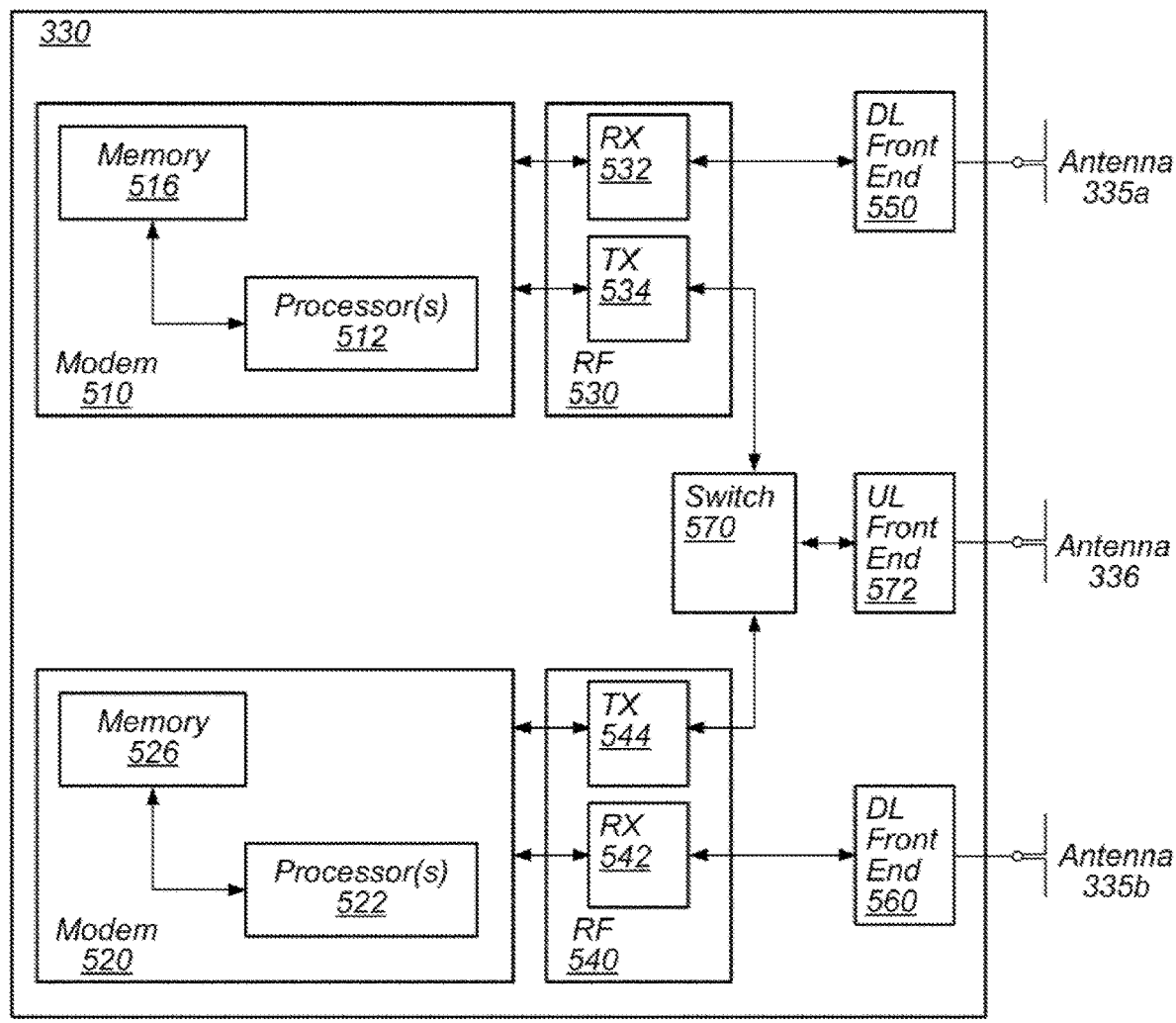
FIG. 5 illustrates an example block diagram of cellular communication circuitry.

FIG. 5 illustrates an example block diagram of cellular communication circuitry 330. It is noted that the block diagram of the cellular communication circuitry 330 of FIG. 5 is an example of a possible cellular communication circuit. In some implementations, the cellular communication circuitry 330 may be included in a communication device, such as the communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet, a wireless sensor, surveillance equipment, or wearables devices, or a combination of them, among other devices.

The cellular communication circuitry 330 may couple (e.g., communicatively; directly or indirectly) to one or more antennas, such as antennas 335 a-b and 336 as shown (in FIG. 3). In some implementations, the cellular communication circuitry 330 includes or is communicatively coupled to dedicated receive chains, processors, or radios for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

The modem 510 includes one or more processors 512 and a memory 516 in communication with the processors 512. The modem 510 is in communication with a radio frequency (RF) front end 530. The RF front end 530 may include circuitry for transmitting and receiving radio signals. For example, the RF front end 530 includes receive circuitry (RX) 532 and transmit circuitry (TX) 534. In some implementations, the receive circuitry 532 is in communication with downlink (DL) front end 550, which may include circuitry for receiving radio signals via antenna 335a.

Similarly, the modem 520 includes one or more processors 522 and a memory 526 in communication with the processors 522. The modem 520 is in communication with an RF front end 540. The RF front end 540 may include circuitry for transmitting and receiving radio signals. For example, the RF front end 540 may include receive circuitry 542 and transmit circuitry 544. In some implementations, the receive circuitry 542 is in communication with DL front end 560, which may include circuitry for receiving radio signals via antenna 335b.

The modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), the processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement some or all of the features described herein.

The processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

The modem 520 may include hardware and software components for implementing the above features for time division multiplexing UL data for NSA NR operations, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, the processors 522 may include one or more processing elements. Thus, the processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

According to certain aspects of the present disclosure, a new category of reduced capability 5G NR UE (sometimes referred to here as a "NR light UE" or "NL UE") is introduced. The NR light UE can include some or all of the components of a typical UE (e.g., the UE 106, described above), but can include certain hardware and software modifications or reductions, such as a reduced number of RX or TX antennas, to reduce cost or complexity, or both. For example, in some implementations, the NR light UE includes one or a combination of two or more of the following relaxed requirements to reduce UE complexity: no simultaneous receptions of multiple unicast or broadcast transport blocks (TBs), or both; a reduced TB size for broadcast and unicast data; a reduced number of soft channel bits; operating in a reduced bandwidth system at RF/Base Band (BB) for downlink (DL) and uplink (UL) with possible retuning within the whole NR system bandwidth (e.g., the reduced bandwidth can depend on the configured subcarrier spacing); a reduced transmission power, such as a maximum transmission power; or a reduced UL or DL data rate, such as a peak data rate. By establishing the NR light UE category within the 5G NR framework, UE cost and complexity can be reduced, and wireless communication support can be provided for additional UEs, such as industrial sensors, video surveillance systems, and wearable devices, which meet the relaxed capability requirements.

Other features of the NR UE can include the following. In some implementations, the NL UE accesses a cell (e.g., the base station 102) only if the master information block (MIB) received from the cell indicates permission. Otherwise, the NL UE can consider the cell as barred. In some implementations, aspects for common control and random access include: a NL UE may receive separate occurrence of system information block (SIB) from the base station (e.g. in different time or frequency resources), broadcast control channel (BCCH) modification period for NL UEs may be a multiple of the legacy (e.g., non-NL UE) BCCH modification period, a set of physical random access channel (PRACH) resources, such as frequency, time, preamble or random access response (RAR) related information, or combinations of them, may be provided separately to the NL UEs.

For NL UEs, reducing, for example, the number of RX antennas can reduce cost, but would turn in reduced coverage for this type of UE. Thus, the coverage loss should be addressed for different DL channels to maintain coverage performance of NL UEs.

The techniques described here compensate coverage loss for NL UEs and other UEs through PBCH extension. In this manner, a cell can provide NL UEs (and other UEs) more opportunities and greater flexibility to obtain system information to connect to the cell and therefore maintain wireless communication coverage. Although these techniques are described in the context of PBCH channel, the techniques can be applied to other DL channels, such as the physical downlink control channel (PDCCH), in some implementations. Further, although these techniques are described in the context of NL UEs, the techniques are generally applicable to other UEs such as those described here. For purposes of the present disclosure, the term "legacy PBCH" is used to refer generally to PBCH transmitted in accordance with a previous version of a standard (e.g., 5G NR release 16 or earlier) relative to the extended PBCH described here.

In general, PBCH, both legacy and extended, provides basic system information to UEs, including NL UEs. A cell (e.g., the base station 102) can transmit the PBCH in a downlink transmission to a UE. The UE can decode the information on the PBCH in order to access the cell. Information provided by the PBCH can include, for example, timing information within radio frame, SS burst set periodicity, system frame number, and other higher layer information. In some implementations, other broadcast information, such as a primary synchronization signal (PSS) and a secondary synchronization signal (SSS), are transmitted with the PBCH.

In some implementations, PBCH may be repeatedly extended within a transmission time interval (TTI), which may be 80 ms in the case of 5G NR PBCH. Different options can be considered for extended PBCH (EPBCH) transmission across TTIs. In some implementations, the base station can transmit the EPBCH in every TTI (e.g., every 80 ms cycle) as long as extended transmission is enabled (e.g., based on higher layer signaling such as PBCH/System Information Blocks (SIB)). This is beneficial from a power saving perspective, as a UE can assume the same hypothesis regarding presence of an EPBCH block upon waking up, for example, in discontinuous reception (DRX) operation, as it had determined during an earlier acquisition period. In this and other approaches, the legacy PBCH may be transmitted in its normal location to ensure compatibility with UEs that do not use the EPBCH approach. Moreover, the legacy PBCH can be utilized by, for example, the NL UE in addition to or instead of the EPBCH.

Figure 6:
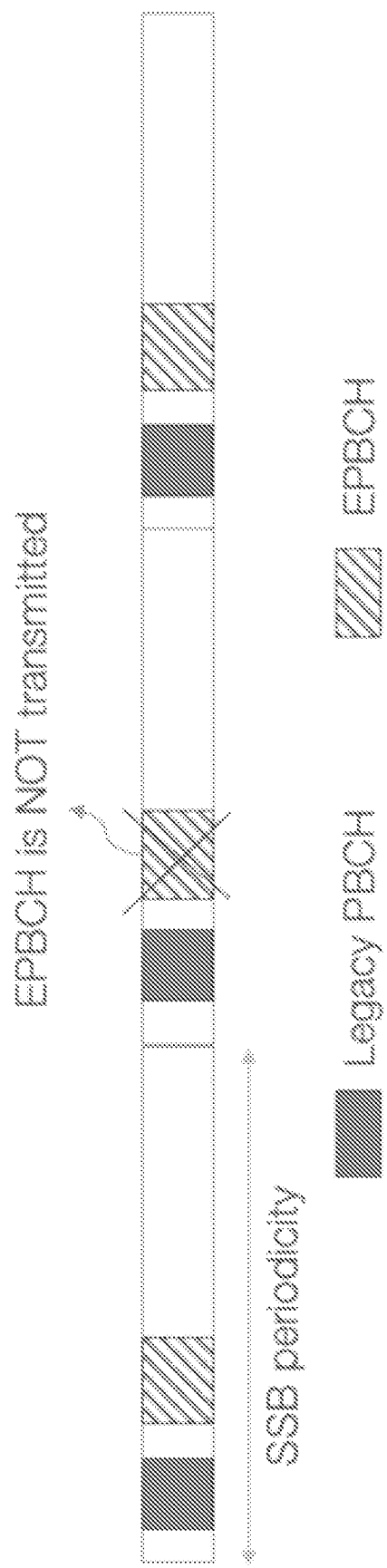
FIGS. 6 through 8 illustrate examples of extended physical broadcast channel (EPBCH) transmissions.

In some implementations, EPBCH transmission is dynamically determined by a cell during each TTI, as illustrated in FIG. 6. This provides flexibility for a network scheduler of the cell to prioritize another broadcast transmission, such as a paging transmission, that may be overlapped with EPBCH transmissions. For example, if the network scheduler determines that another transmission is scheduled for transmission such that the transmission would overlap with an EPBCH transmission, the network scheduler can give the other transmission higher priority and can withhold or delay the EPBCH transmission (e.g., until the next TTI), as shown in FIG. 6. Under this approach, it is up to the UE to detect the presence of an EPBCH transmissions during each TTI. In some implementations, a UE correlates hypothetical resource elements (REs) containing EPBCH transmissions to determine whether an actual EPBCH exists in the current TTI. To reduce power consumption, a UE may power off or early-terminate EPBCH detection in the remainder of the frame if it determines an absence of EPBCH transmission in a particular cycle.

Figure 7:
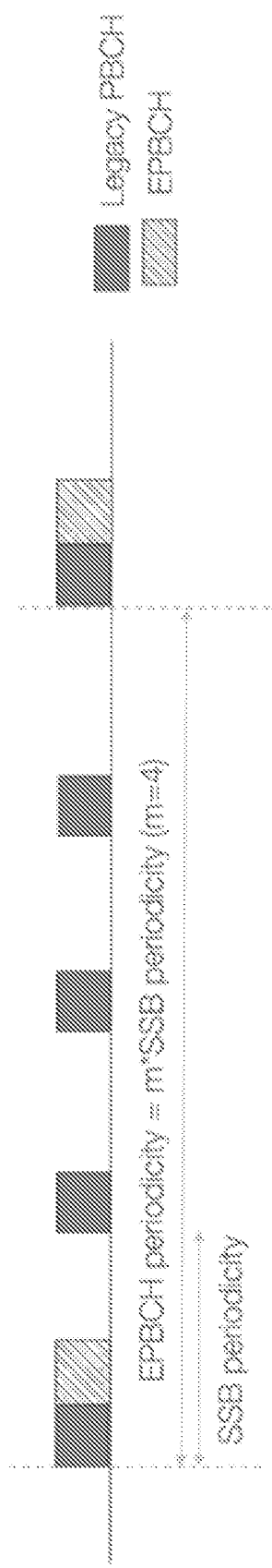

In some implementations, EPBCH transmission is operated at a predefined periodicity according to one or more time-domain patterns. This option is mainly motivated by the potential power saving benefit due to, for example, its predictability and minimizing signaling overhead by avoiding unnecessary PBCH repetition. In some implementations, the EPBCH transmission period boundaries are defined by system frame number (SFN) values according to the equation SFN mod (m*T)=0, where m is the number of EPBCH blocks per legacy PBCH/Synchronization signal block (SSB) period, and T is the legacy PBCH/SSB block period. The value of m can be determined based on, for example, the frequency bands. In some implementations, the value of m is fixed in a specification (e.g., one or more of the 3GPP 5G NR technical specifications). An example of this approach is shown in FIG. 7 with m=4.

Figure 8:
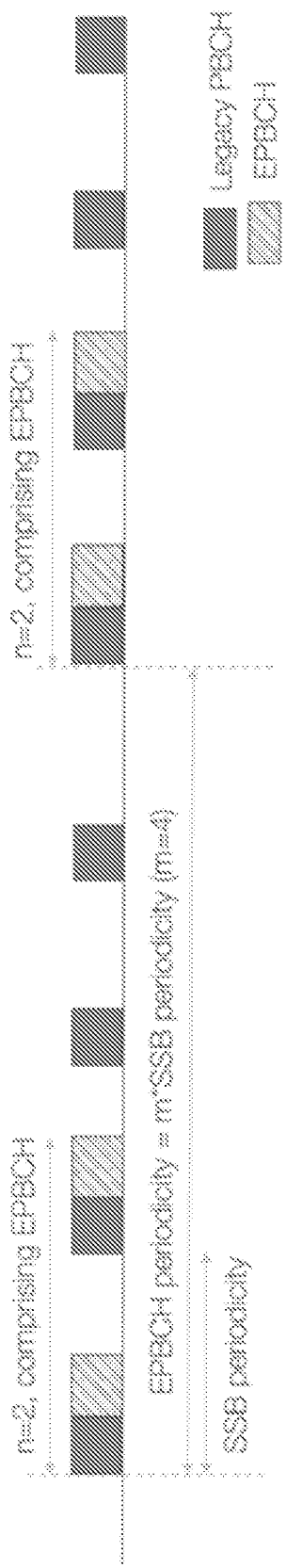

In some implementations, one or more of these approaches are combined. For example, the approaches described with reference to FIGS. 6 and 7 may be combined by predefining a pair of values {m, n}, where m is as described above and n is the number of EPBCH transmissions with the EBPCH period. An example of this combined approach is illustrated in FIG. 8 with {m=4, n=2}.

Figure 9A:
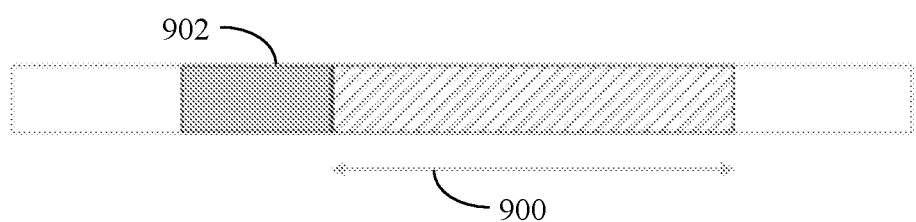
FIGS. 9A, 9B and 10 illustrate examples of an extension window for EPBCH transmissions.
Figure 9B:
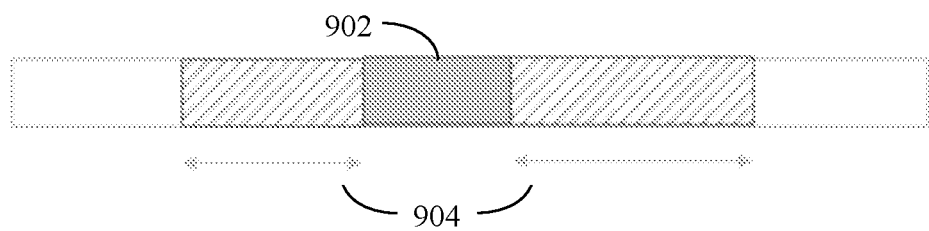

To facilitate EPBCH transmission within the existing standards, an extension window can be defined and the EPBCH transmission can be confined to the extension window. Referring to FIG. 9A, in some implementations, a EPBCH extension window 900 starts from a slot after the last slot of the legacy SS/PBCH block 902 (e.g., after the reception symbol). Referring to FIG. 9B, to further reduce UE initial access latency, an EPBCH extension window 904 can be located both before the first slot of the legacy SS/PBCH block 902 and after the last slot of the legacy SS/PBCH block.

Figure 10:
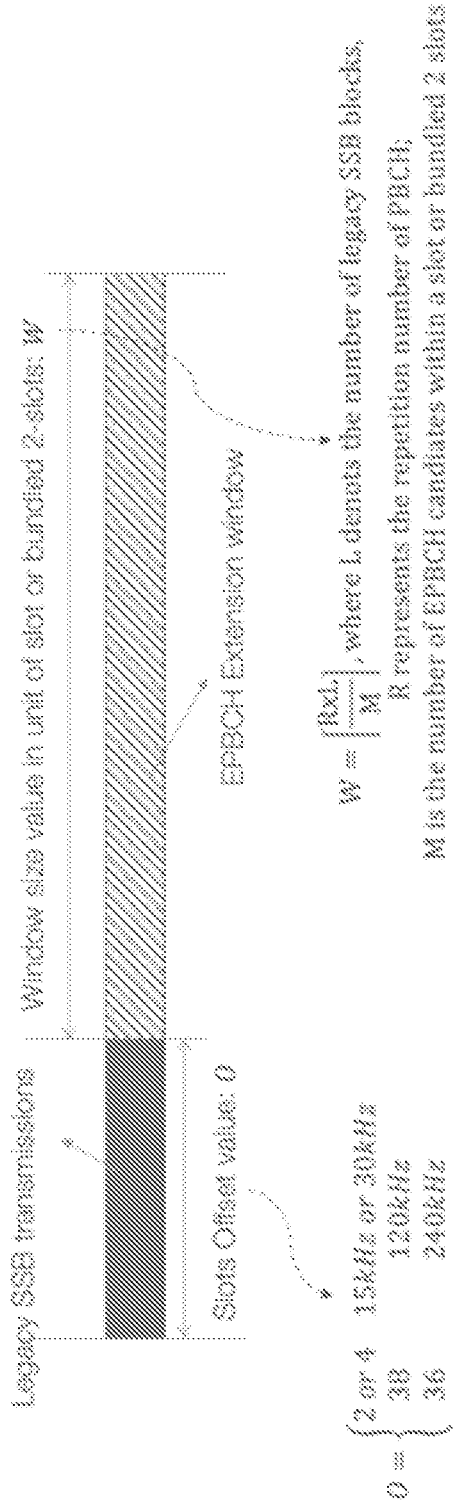

Referring to FIG. 10, in some implementations, the size of the EPBCH extension window size W is determined by $$W = \left\lceil \frac{R \times L}{M} \right\rceil,$$

where R is the PBCH repetition number, L is the number of legacy SSB blocks (sometimes referred to here as SS/PBCH blocks or simply PBCH blocks), and M is the number of EPBCH candidates within a slot or bundled 2-slots (e.g., for 240 kHz sub-carrier spacing (SCS)). This equation can be used to define the EPBCH extension window size regardless of whether the EBPCH starts before or after the legacy PBCH block. In some implementations, a slot offset value (O) is used to determine the first slot of the EPBCH transmission. The offset value can depend on, for example, the SCS used for the EPBCH transmission, where O is 2 or 4 for 15 kHz or 30 kHz SCS, 38 for 120 kHz SCS, and 36 for 240 kHz SCS.

Figure 11:
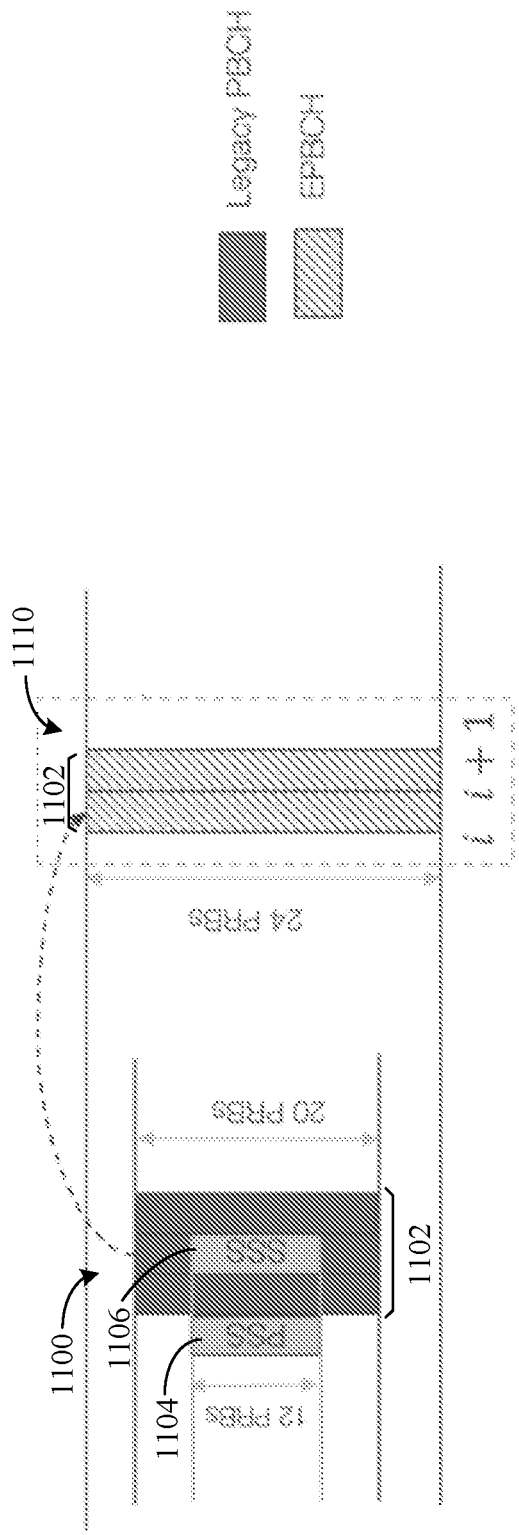
FIGS. 11, 12, 13A and 13B illustrate examples of EPBCH resource mapping.

As shown in FIG. 11, in some implementations, an EPBCH 1100 includes PBCH 1102, PSS 1104, and SSS 1106. Including this additional signaling information in the EPBCH can reduce access latency by a UE. In some implementations, an EPBCH 1110 includes PBCH 1112 without PSS or SSS to minimize signaling overhead. Under this approach, the sequence of complex-value PBCH symbols (e.g., PBCH 1102) can be scaled by a factor $\beta_{EPBCH}$ to produce PBCH symbols (e.g., PBCH 1112) that conform to power allocation and boosting requirements. The PBCH symbols 1112 can then be mapped, for example, in sequence to resource elements in two consecutive symbols i and i+1. In some implementations, the EPBCH 1110 may occupy different bandwidth or number of resource blocks (RBs) compared to legacy PBCH (e.g., PBCH 1102). For example, as shown in FIG. 11, the EPBCH 1110 may transmit over increased number of RBs (e.g., 24 PRBs) in each of two consecutive symbols to reach a same coding rate as a legacy 3-symbol PBCH using 20 PRBs.

Figure 12:
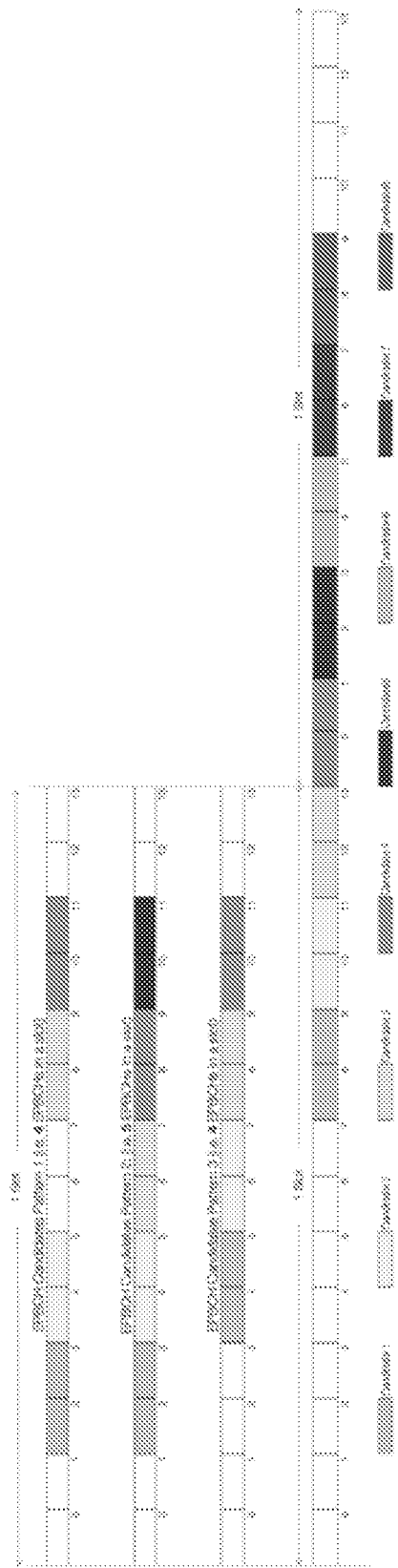

The techniques described here also provide for mapping of the EPBCH transmission to resources within the channel, as shown in FIG. 12. In some implementations, EPBCH symbols are mapped to preserve X symbols at the beginning of a slot, for example, for DL control data. For example, the EPBCH can be mapped to preserve X=2 for 15 kHz or 30 kHz SCS, or X=4 for 120 kHz SCS. In some implementations, EPBCH symbols can be mapped to preserve Y symbols at the end of a slot, for example, for guard period and UL control data. For example, the EPBCH can be mapped to preserve Y=2 for 15 kHz, 30 kHz, or 120 kHz SCS. In some implementations, such as for larger SCS (e.g., 240 kHz), X and Y symbols may be reserved for every two concatenated consecutive slots (e.g., X=8 and Y=4). The EPBCH transmission may or may not cross the middle of the slot defined by, for example, 15 kHz SCS, as shown by pattern 1 and pattern 2 in FIG. 13, respectively. Other patterns can be used, for example, based at least in part on the SCS for the EPBCH transmission.

Figure 13A:
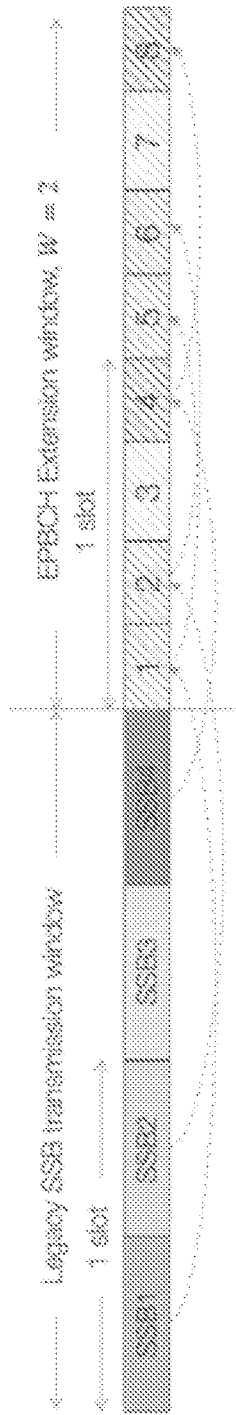
Figure 13B:
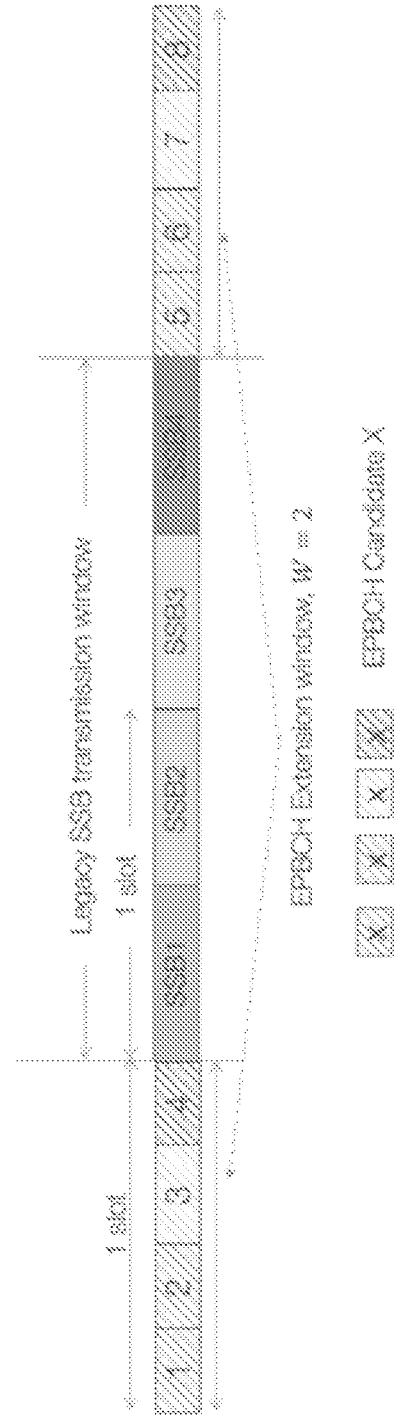

The EPBCH candidates in an extension window can be indexed in an order, such as an ascending order in the time domain. For example, the EBPCH candidates can be indexed from 0 to (R*L)−1, where R is the PBCH repetition number and L is the number of legacy SSB blocks. In some implementations, the association between the PBCH in a legacy SSB block i and EPBCH index j is computed as follows: j=i+L*n, 0≤n≤R. FIGS. 13A and 13B illustrate different examples of one-to-one mapping or association between SSB blocks and EPBCH candidates assuming a 15 kHz SSC and L=4 and R=2. In particular, FIG. 13A illustrates an example of mapping or association for an EPBCH extension window occurring after the SSB blocks, and FIG. 13B illustrates an example of mapping or associate where the EPBCH extension window starts before and spans the SSB blocks. In some implementations, a different redundancy version (RV) of the master information block (MIB) may be used for EPBCH transmissions. For example, the RV sequence (e.g., {3,1,2,0}) may be predefined in a standard, such the 5G NR standard.

Figure 14:
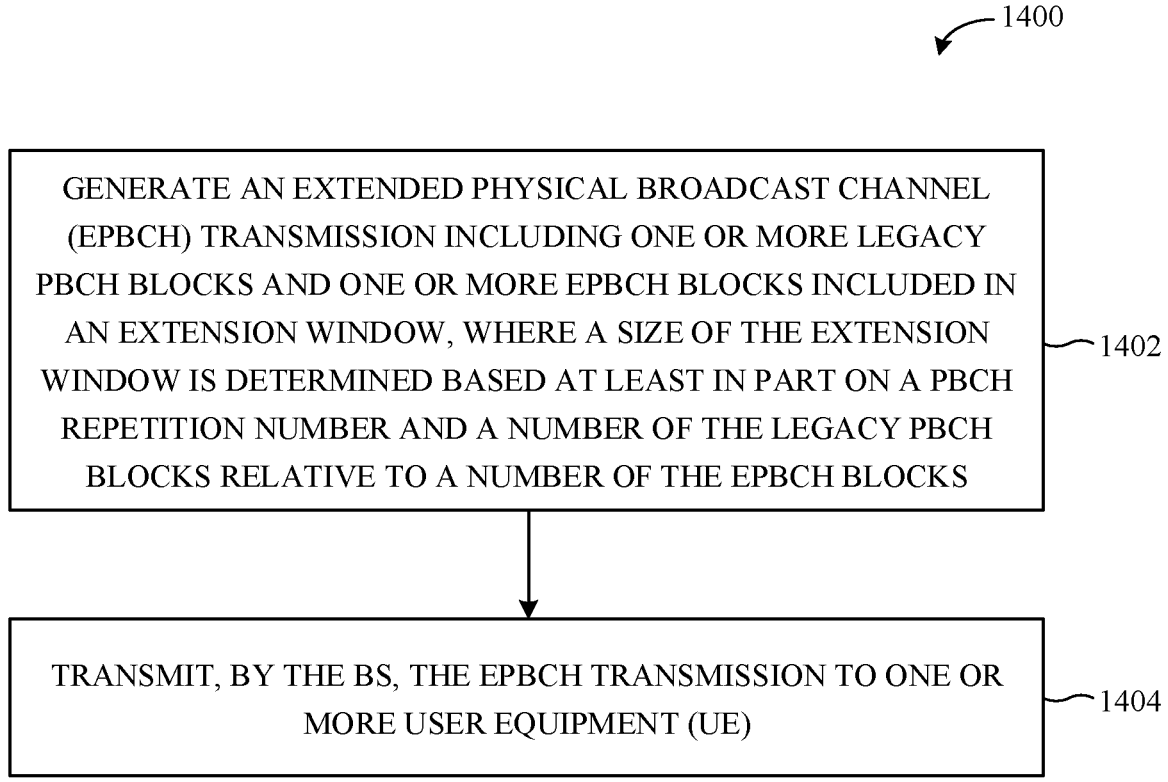
FIGS. 14 and 15 illustrate example processes for PBCH extension.

FIG. 14 illustrates a flowchart of an example process 1400 for PBCH extension. In some implementations, the process 1400 is performed by one or more of the devices or systems described here.

Operations of the process 1400 include generating an extended physical broadcast channel (EPBCH) transmission including one or more legacy PBCH blocks and one or more EPBCH blocks within an extension window (1402). The EPBCH can be generated by, for example, the BS 102. A size of the extension window (e.g., the extension window 902, 904) can be determined based at least in part on a PBCH repetition number and a number of the legacy PBCH blocks relative to a number of the EPBCH blocks.

In some implementations, the one or more EPBCH blocks are transmitted by the BS in each transmission time interval (TTI) (e.g., 80 ms). In some implementations, the BS can determine whether an EPBCH block of the one or more EPBCH blocks overlaps with another data block in a current TTI, and the transmission of the EPBCH block can be scheduled based on the determination. In some implementations, the one or more EPBCH blocks are transmitted by the BS at a predefined periodicity according to a time-domain pattern. For example, the EPBCH blocks can be transmitted according to a time-domain pattern defined by SFN mod (m*T), where SFN represents system frame number, T represents a PBCH block period, and m represents a number of PBCH periods. The predefined periodicity can be based at least in part on a frequency band of the EPBCH transmission.

In some implementations, the extension window starts from a slot after the last of the one or more legacy PBCH blocks. Alternatively, in some implementations, the extension window starts from a slot before the first of the one or more legacy PBCH blocks and ends at a slot after the last of the one or more legacy PBCH blocks.

The EPBCH transmission is transmitted to one or more UEs (1404). For example, the EPBCH transmission can be transmitted by the BS 102 to one or more UEs 106A, 106B, . . . 106N, which can include NL UEs. At least one of the one or more EPBCH blocks can include PBCH. The PBCH can be scaled and mapped to two symbols. The PBCH can occupy an increased number of resource blocks in each of the two symbols relative to a number of resource blocks occupied by PBCH in each symbol of the legacy PBCH blocks. In some implementations, the symbols of the one or more EPBCH blocks are mapped to preserve uplink control symbols or downlink control symbols or both. In some implementations, the one or more EPBCH blocks include a primary synchronization signal (PSS) and a secondary synchronization signal (SSS) in addition to the PBCH.

Figure 15:
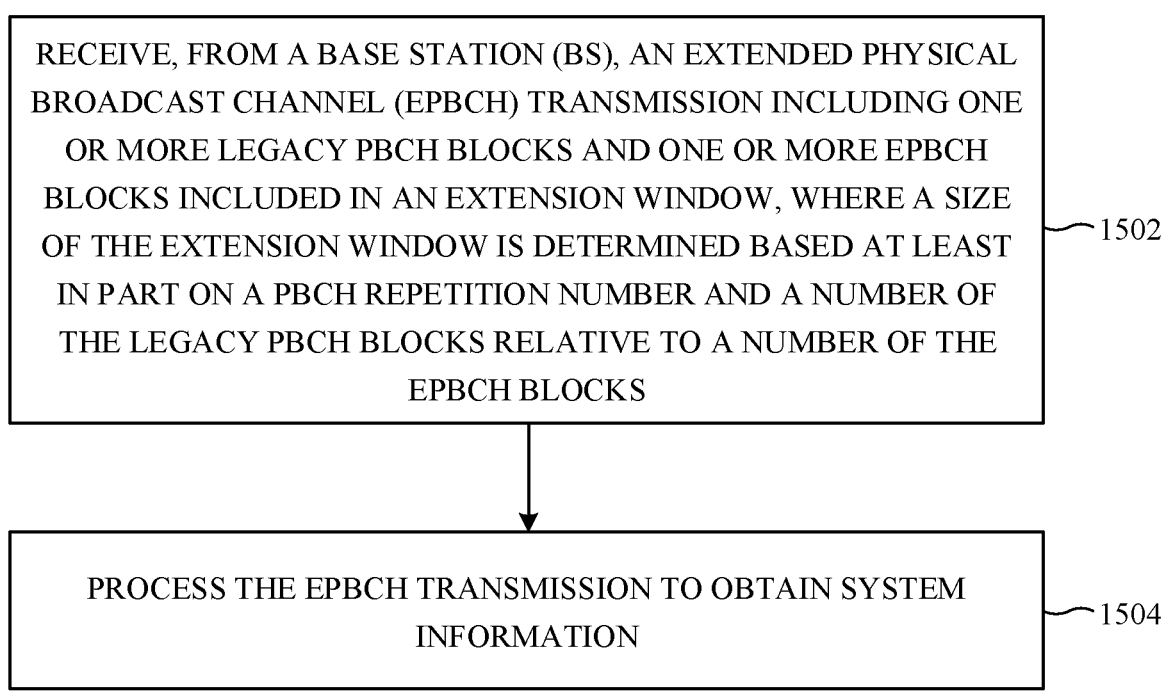

FIG. 15 illustrates a flowchart of an example process 1500 for PBCH extension. In some implementations, the process 1500 is performed by one or more of the systems and devices described here.

Operations of the process 1500 include receiving, from a BS, an extended physical broadcast channel (EPBCH) transmission including one or more legacy PBCH blocks and one or more EPBCH blocks included in an extension window (1502). A size of the extension window is determined based at least in part on a PBCH repetition number and a number of the legacy PBCH blocks relative to a number of the EPBCH blocks. For example, the EPBCH transmission can be received by a UE 106 from the BS 102. In some implementations, the UE includes a reduced capability UE (e.g., a NL UE) having one or a combination of two or more of the following features: a reduced bandwidth, a reduced peak data rate, a reduced transmission power, a reduced number of soft channel bits, a reduced transport block size for broadcast or unicast, or no simultaneous reception of broadcast or unicast transport blocks.

In some implementations, the one or more EPBCH blocks are received by the UE in each transmission time interval (TTI) (e.g., 80 ms). In some implementations, the BS is configured to determine whether an EPBCH block of the one or more EPBCH blocks overlaps with another data block in a current TTI, and the EPBCH block is received based on a determination by the BS that the EPBCH block does not overlap with another data block in the current TTI. In some implementations, the one or more EPBCH blocks are received by the UE at a predefined periodicity according to a time-domain pattern. For example, the EPBCH blocks can be received according to a time-domain pattern defined by SFN mod (m*T), where SFN represents system frame number, T represents a PBCH block period, and m represents a number of PBCH periods. The predefined periodicity can be based at least in part on a frequency band of the EPBCH transmission.

In some implementations, the extension window starts from a slot after the last of the one or more legacy PBCH blocks. Alternatively, in some implementations, the extension window starts from a slot before the first of the one or more legacy PBCH blocks and ends at a slot after the last of the one or more legacy PBCH blocks. The UE can determine whether an EPBCH block of the one or more EPBCH blocks is present in the transmission by correlating hypothetical resource elements containing EPBCH with the received EPBCH transmission.

The EPBCH transmission is processed to obtain system information (1504). For example, the UE (e.g., the UE 106) can process the EPBCH transmission to obtain information for connecting to the BS. For example, the EPBCH transmission can be transmitted by the BS 102 to one or more UEs 106A, 106B, . . . 106N, which can include NL UEs. At least one of the one or more EPBCH blocks can include PBCH. The PBCH can be scaled and mapped to two symbols. The PBCH can occupy an increased number of resource blocks in each of the two symbols relative to a number of resource blocks occupied by PBCH in each symbol of the legacy PBCH blocks. In some implementations, the symbols of the one or more EPBCH blocks are mapped to preserve uplink control symbols or downlink control symbols or both. In some implementations, the one or more EPBCH blocks include a primary synchronization signal (PSS) and a secondary synchronization signal (SSS) in addition to the PBCH.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods described here may be implemented in software, hardware, or a combination thereof, in different implementations. In addition, the order of the blocks of the methods may be changed, and various elements may be added, reordered, combined, omitted, modified, and the like. Various modifications and changes may be made as would be obvious to a person skilled in the art having the benefit of this disclosure. The various implementations described here are meant to be illustrative and not limiting. Many variations, modifications, additions, and improvements are possible. Accordingly, plural instances may be provided for components described here as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component.

What is claimed is:

1. A method, comprising:
receiving one or more extended physical broadcast channel (EPBCH) transmissions, wherein the one or more EPBCH transmissions are transmitted over a physical broadcast channel (PBCH) according to a time-domain pattern, and wherein the time-domain pattern is based on a synchronization signal block (SSB) transmission period; and
processing the one or more EPBCH transmissions to obtain system information.

2. The method of claim 1, wherein the time-domain pattern is based on the SSB transmission period multiplied by a constant.

3. The method of claim 2, wherein a value of the constant is based on a frequency band of the PBCH.

4. The method of claim 2, wherein the SSB transmission period multiplied by the constant comprises an EPBCH period, and wherein a second constant specifies a number of EPBCH transmissions within the EPBCH period.

5. The method of claim 1, wherein the time-domain pattern is defined by SFN mod (m*T), where SFN represents a system frame number, T represents the SSB transmission period, and m represents a number of SSB transmission periods.

6. The method of claim 1, wherein a period of the one or more EPBCH transmissions is different from the SSB transmission period.

7. The method of claim 1, wherein the one or more EPBCH transmissions comprise at least one of a PBCH, a primary synchronization signal (PSS), or a secondary synchronization signal (SSS).

8. The method of claim 1, wherein contents of each of the one or more EPBCH transmissions is scaled and mapped to two consecutive symbols.

9. The method of claim 8, wherein each of the one or more EPBCH transmissions occupies an increased number of resource blocks in each of the two consecutive symbols relative to a number of resource blocks occupied by a SSB transmission.

10. A processor configured to, when executing instructions stored in a memory, perform operations comprising:
receiving one or more extended physical broadcast channel (EPBCH) transmissions, wherein the one or more EPBCH transmissions are transmitted over a physical broadcast channel (PBCH) according to a time-domain pattern, and wherein the time-domain pattern is based on a synchronization signal block (SSB) transmission period; and
processing the one or more EPBCH transmissions to obtain system information.

11. The processor of claim 10, wherein the time-domain pattern is based on the SSB transmission period multiplied by a constant.

12. The processor of claim 11, wherein the SSB transmission period multiplied by the constant comprises an EPBCH period, and wherein a second constant specifies a number of EPBCH transmissions within the EPBCH period.

13. The processor of claim 10, wherein the time-domain pattern is defined by SFN mod (m*T), where SFN represents a system frame number, T represents the SSB transmission period, and m represents a number of SSB transmission periods.

14. The processor of claim 10, wherein a period of the one or more EPBCH transmissions is different from the SSB transmission period.

15. The processor of claim 10, wherein the one or more EPBCH transmissions comprise at least one of a PBCH, a primary synchronization signal (PSS), or a secondary synchronization signal (SSS).

16. The processor of claim 10, wherein contents of each of the one or more EPBCH transmissions is scaled and mapped to two consecutive symbols.

17. The processor of claim 16, wherein each of the one or more EPBCH transmissions occupies an increased number of resource blocks in each of the two consecutive symbols relative to a number of resource blocks occupied by a SSB transmission.

18. A method, comprising:
generating one or more extended physical broadcast channel (EPBCH) transmissions; and
transmitting the one or more EPBCH transmissions over a physical broadcast channel (PBCH) according to a time-domain pattern, wherein the time-domain pattern is based on a synchronization signal block (SSB) transmission period.

19. The method of claim 18, wherein the time-domain pattern is based on the SSB transmission period multiplied by a constant.

20. The method of claim 18, wherein a period of the one or more EPBCH transmissions is different from the SSB transmission period.

* * * * *